United States Patent
Guo et al.

(10) Patent No.: US 10,049,113 B2
(45) Date of Patent: Aug. 14, 2018

(54) FILE SCANNING METHOD AND APPARATUS

(71) Applicant: BAIDU ONLINE NETWORK TECHNOLOGY (BEIJING) CO., LTD., Beijing (CN)

(72) Inventors: Mingqiang Guo, Beijing (CN); Keming Qian, Guangdong (CN); Liang Cao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 284 days.

(21) Appl. No.: 14/777,155

(22) PCT Filed: Aug. 29, 2014

(86) PCT No.: PCT/CN2014/085545
§ 371 (c)(1),
(2) Date: Sep. 15, 2015

(87) PCT Pub. No.: WO2016/029441
PCT Pub. Date: Mar. 3, 2016

(65) Prior Publication Data
US 2016/0203149 A1     Jul. 14, 2016

(30) Foreign Application Priority Data
Aug. 25, 2014 (CN) .......................... 2014 1 0421430

(51) Int. Cl.
*G06F 17/30* (2006.01)
*G06F 3/06* (2006.01)

(52) U.S. Cl.
CPC ...... *G06F 17/30106* (2013.01); *G06F 3/0643* (2013.01); *G06F 17/30091* (2013.01)

(58) Field of Classification Search
CPC ......... G06F 17/30106; G06F 17/30091; G06F 3/0643
(Continued)

(56) References Cited

U.S. PATENT DOCUMENTS 6,389,433 B1 *  5/2002  Bolosky .............. G06F 11/1453
                                                          707/749
8,943,595 B2 *  1/2015  Piccinini ............... G06F 21/564
                                                           726/22
(Continued)

FOREIGN PATENT DOCUMENTS

CN     102750463 A     10/2012
CN     102982121 A     3/2013
(Continued)

OTHER PUBLICATIONS

"Hard link", Wikipedia, downloaded from: en.wikipedia.org/wiki/Hard_link on Oct. 25, 2017, pp. 1-4.*
(Continued)

*Primary Examiner* — Robert Stevens
(74) *Attorney, Agent, or Firm* — Lathrop Gage LLP

(57) ABSTRACT

Disclosed are a file scanning method and apparatus. The method includes: obtaining a quantity of hard links of a to-be-scanned file used as a scanning target; if the quantity of hard links of the to-be-scanned file is greater than 1, when the to-be-scanned file is used as the scanning target for the first time, invoking a scanning engine to scan the to-be-scanned file to obtain a scanning result, and storing a file identifier uniquely identifying the to-be-scanned file and the scanning result to a storage unit, and when the to-be-scanned file is used as the scanning target again, querying for and obtaining the scanning result of the to-be-scanned file from the storage unit according to the file identifier.

15 Claims, 5 Drawing Sheets

(58) Field of Classification Search
USPC .......................................................... 707/769
See application file for complete search history.

(56) References Cited

U.S. PATENT DOCUMENTS

| | | | |
|---|---|---|---|
| 8,972,466 B1* | 3/2015 | Kumar | G06F 17/30091 707/823 |
| 9,104,675 B1* | 8/2015 | Clark | G06F 17/30091 |
| 9,342,528 B2* | 5/2016 | Clash | G06F 17/302 |
| 2004/0083381 A1 | 4/2004 | Sobel et al. | |
| 2007/0043747 A1* | 2/2007 | Benton | G06F 17/30067 |
| 2010/0306523 A1* | 12/2010 | Nguyen | G06F 11/1435 713/2 |
| 2011/0107274 A1* | 5/2011 | Carlson | G06F 9/4443 715/855 |
| 2011/0191291 A2* | 8/2011 | Balakrishnan | G06F 11/1451 707/618 |
| 2012/0191736 A1 | 7/2012 | Yamaguchi | |
| 2014/0201177 A1* | 7/2014 | Suryanarayan | G06F 17/30194 707/705 |
| 2017/0220588 A1* | 8/2017 | Tian | G06F 17/30082 |

FOREIGN PATENT DOCUMENTS

| | | |
|---|---|---|
| CN | 103473240 A | 12/2013 |
| CN | 103473350 A | 12/2013 |

OTHER PUBLICATIONS

"GetFileInformationByHandle function", MSDN, downloaded from: msdn.microsoft.com/en-us/library/windows/desktop/aa364952(v=vs.85).aspx on Oct. 29, 2017, pp. 1-3.*

"By_Handle_File_Information structure", MSDN, downloaded from: msdn.microsoft.com/en-us/library/windows/desktop/aa363788(v=vs.85).aspx on Oct. 29, 2017, pp. 1-3.*

"C#—count and list hardlink locations of a file", StackOverflow, downloaded from: stackoverflow.com/questions/4510269/c-sharp-count-and-list-hardlink-locations-of-a-file on Oct. 29, 2017, 1 page.*

Wischik, Lucian, "To compare two filenames", The Visual Basic Team, Sep. 23, 2008, downloaded from: blogs.msdn.microsoft.com/vbteam/2008/09/23/to-compare-two-filenames-lucian'wischik/, pp. 1-5.*

International Search Report & Written Opinion corresponding to International Patent Application No. PCT/CN2014/085545, dated Apr. 29, 2015, 21 pages.

* cited by examiner

FILE SCANNING METHOD AND APPARATUS

RELATED APPLICATION

This application is a U.S. national phase application claiming the priority of PCT application No. PCT/CN2014/085545, filed Aug. 29, 2014, which claims the priority to Chinese Patent Application No. 201410421430.0, filed Aug. 25, 2014 and entitled "FILE SCANNING METHOD AND APPARATUS." The disclosure of the above applications is incorporated herein by reference in its entirety.

BACKGROUND

Technical Field

The present invention relates to the field of file scanning, and in particular, to a file scanning method and apparatus.

Related Art

Hard links indicate that multiple paths refer to a single file having the same size (the same check sum calculated by using a one-way algorithm). A file with multiple hard links has only one piece of data in a partition/volume.

In the existing file scanning technology, a scanning engine is invoked to scan files according to a file traversing sequence. Therefore, for a file with multiple hard links, the scanning engine is invoked repeatedly to perform scanning processing (such as reading, and calculating features), which makes the scanning engine do much useless work, increases Input Output (IO) overhead and central processing unit (CPU) overhead, and decreases scanning efficiency.

SUMMARY

In order to solve defects of the existing file scanning technology, embodiments of the present invention provide a file scanning method and apparatus, which may decrease TO overhead and CPU overhead during a scanning process, and improve file scanning efficiency.

In one aspect, an embodiment of the present invention provides a file scanning method, including:

obtaining a quantity of hard links of a to-be-scanned file used as a scanning target;

if the quantity of hard links of the to-be-scanned file is greater than 1, when the to-be-scanned file is used as the scanning target for the first time, invoking a scanning engine to scan the to-be-scanned file to obtain a scanning result of the to-be-scanned file, and storing a file identifier uniquely identifying the to-be-scanned file and the scanning result of the to-be-scanned file to a storage unit, and when the to-be-scanned file is used as the scanning target again, querying for and obtaining the scanning result of the to-be-scanned file from the storage unit according to the file identifier.

In an implementation manner of the embodiment of the present invention, the method further includes: determining the file identifier according to a storage location of the to-be-scanned file in a storage.

Further, the determining the file identifier according to a storage location of the to-be-scanned file in a storage includes: obtaining a storage location of the to-be-scanned file in a magnetic disk, and using the storage location as the file identifier, for example, when the storage includes only one physical magnetic disk. Therefore, regardless of the quantity of hard links of the to-be-scanned file, the to-be-scanned file and the file identifier are in one-to-one correspondence.

Alternatively, further, the determining the file identifier according to a storage location of the to-be-scanned file in a storage includes: obtaining a magnetic disk identifier of a magnetic disk where the to-be-scanned file is located and a storage location of the to-be-scanned file in the magnetic disk, and determining the file identifier according to the magnetic disk identifier of the magnetic disk where the to-be-scanned file is located and the storage location of the to-be-scanned file in the magnetic disk, for example, when the storage includes multiple physical magnetic disks. Therefore, in a storage consists of multiple magnetic disks, regardless of the quantity of hard links of the to-be-scanned file, the to-be-scanned file and the file identifier are in one-to-one correspondence.

Optionally, in the implementation manner, the storage location of the to-be-scanned file in the magnetic disk includes: a starting cluster number of the to-be-scanned file in a partition/volume, a starting offset address of the to-be-scanned file in the partition/volume relative to a physical magnetic disk, a starting sector number of the to-be-scanned file in the partition/volume relative to the physical magnetic disk, and a starting offset address of the to-be-scanned file in the physical magnetic disk or a starting sector number of the to-be-scanned file in the physical magnetic disk.

In another implementation manner of the embodiment of the present invention, the when the to-be-scanned file is used as the scanning target for the first time, invoking a scanning engine to scan the to-be-scanned file to obtain a scanning result of the to-be-scanned file includes: querying the storage unit according to the file identifier, and if the file identifier is not stored in the storage unit, invoking the scanning engine to scan the to-be-scanned file to obtain the scanning result of the to-be-scanned file.

Therefore, the case in which the to-be-scanned file is used as the scanning target for the first time may be determined in time and corresponding processing may be performed.

Further, the storing a file identifier uniquely identifying the to-be-scanned file and the scanning result of the to-be-scanned file to a storage unit includes: after determining that the file identifier is not stored in the storage unit, storing the file identifier to the storage unit; and after invoking the scanning engine and obtaining the scanning result of the to-be-scanned file, storing the scanning result to the storage unit.

Storing the file identifier and invoking the scanning engine may be performed in sequence, or storing the file identifier and invoking the scanning engine may be performed separately. Likely, after invoking the scanning engine and obtaining the scanning result of the to-be-scanned file, storing the scanning result and processing the next to-be-scanned file may be performed in sequence, or storing the scanning result and processing the next to-be-scanned file may be performed separately.

In still another implementation manner of the embodiment of the present invention, the when the to-be-scanned file is used as the scanning target again, querying for and obtaining the scanning result of the to-be-scanned file from the storage unit according to the file identifier includes: querying the storage unit according to the file identifier, and if the file identifier is stored in the storage unit, querying for and obtaining the scanning result of the to-be-scanned file from the storage unit according to the file identifier.

Therefore, the case in which the to-be-scanned file is used as the scanning target again may be determined in time and corresponding processing may be performed.

In yet another implementation manner of the embodiment of the present invention, the method further includes: if the quantity of hard links of the to-be-scanned file is 1, invoking the scanning engine to scan the to-be-scanned file to obtain the scanning result of the to-be-scanned file. Therefore, the to-be-scanned file with one hard link can be processed.

Correspondingly, an embodiment of the present invention also provides a file scanning apparatus, including:

a hard link quantity obtaining unit, configured to obtain a quantity of hard links of a to-be-scanned file used as a scanning target;

a first processing unit, configured to: if the quantity of hard links of the to-be-scanned file is greater than 1, when the to-be-scanned file is used as the scanning target for the first time, invoke a scanning engine to scan the to-be-scanned file to obtain a scanning result of the to-be-scanned file, and store a file identifier uniquely identifying the to-be-scanned file and the scanning result corresponding to the to-be-scanned file to a storage unit;

the storage unit, configured to store the file identifier and the scanning result; and a second processing unit, configured to: if the quantity of hard links of the to-be-scanned file is greater than 1, when the to-be-scanned file is used as the scanning target again, query for and obtain the scanning result of the to-be-scanned file from the storage unit according to the file identifier.

In an implementation manner of the embodiment of the present invention, the apparatus further includes: an identifier determining unit, configured to determine the file identifier according to a storage location of the to-be-scanned file in a storage.

Further, the identifier determining unit includes: a first obtaining module, configured to obtain a storage location of the to-be-scanned file in a magnetic disk, and use the storage location as the file identifier, for example, when the storage includes one magnetic disk. Therefore, regardless of the quantity of hard links of the to-be-scanned file, the to-be-scanned file and the file identifier are in one-to-one correspondence.

Alternatively, further, the identifier determining unit includes: a second obtaining module, configured to obtain a magnetic disk identifier of a magnetic disk where the to-be-scanned file is located and a storage location of the to-be-scanned file in the magnetic disk; and an identifier determining module, configured to determine the file identifier according to the magnetic disk identifier of the magnetic disk where the to-be-scanned file is located and the storage location of the to-be-scanned file in the magnetic disk, for example, when the storage includes at least two magnetic disks. Therefore, in a storage consists of multiple magnetic disks, regardless of the quantity of hard links of the to-be-scanned file, the to-be-scanned file and the file identifier are in one-to-one correspondence.

In another implementation manner of the embodiment of the present invention, the first processing unit includes: a first triggering module, configured to query the storage unit according to the file identifier and trigger, when it is determined that the file identifier is not stored in the storage unit, to invoke the scanning engine.

Therefore, the case in which the to-be-scanned file is used as the scanning target for the first time may be determined in time and corresponding processing may be triggered.

Further, the first processing unit further includes: an identifier storage module, configured to store the file identifier to the storage unit; and a result storage module, configured to store, after the first processing unit obtains the scanning result of the to-be-scanned file, the scanning result to the storage unit. The first triggering module is also configured to trigger, when it is determined that the file identifier is not stored in the storage unit, the identifier storage module.

In still another implementation manner of the embodiment of the present invention, the second processing unit includes: a second triggering module, configured to query the storage unit according to the file identifier and trigger, when it is determined that the file identifier is stored in the storage unit, a result obtaining module; and the result obtaining module, configured to query for and obtain the scanning result of the to-be-scanned file from the storage unit according to the file identifier.

Therefore, the case in which the to-be-scanned file is used as the scanning target again may be determined in time and corresponding processing may be triggered.

In yet another implementation manner of the embodiment of the present invention, the apparatus further includes: a third processing unit, configured to invoke, when the quantity of hard links of the to-be-scanned file is 1, the scanning engine to scan the to-be-scanned file to obtain the scanning result of the to-be-scanned file. Therefore, the to-be-scanned file with one hard link can be processed.

Correspondingly, an embodiment of the present invention also provides a computer storage medium. The computer storage medium includes a computer program. When executed by one or more computers, the computer program causes the one or more computers to perform the following operations: operations including steps included in the foregoing method embodiment of the present invention or any implementation manner of the foregoing method embodiment of the present invention.

Correspondingly, an embodiment of the present invention also provides a device including at least one processor, a storage, and at least one computer program, where the at least one computer program is stored in the storage and executed by the at least one processor; and the computer program includes instructions for performing the following operations: operations including steps included in the foregoing method embodiment of the present invention or any implementation manner of the foregoing method embodiment of the present invention.

Correspondingly, an embodiment of the present invention also provides a computer program used for file scanning. The computer program includes instructions for performing the following operations: operations including steps included in the foregoing method embodiment of the present invention or any implementation manner of the foregoing method embodiment of the present invention.

Embodiments of the present invention have the following beneficial effects:

A to-be-scanned file is processed according to a quantity of hard links of the to-be-scanned file. Specifically, for a file with more than one hard link, scanning is performed on the file only when the file is used as a to-be-scanned file for the first time; however, when the file is used as the to-be-scanned file again, a result of the first scanning may be directly obtained without repeated scanning, which significantly decreases TO overhead and CPU overhead during a scanning process and improves file scanning efficiency.

DETAILED DESCRIPTION

The following elaborates aspects of the present invention in combination with the accompany drawings and specific implementation manners. Well-known modules and units, and connections, links, communications, or operations between them are not shown or described in detail. Moreover, the described features, architectures, or functions may be combined in any manner in one or more implementation manners. A person skilled in the art should understand that the following implementation manners are only illustrative, and are not intended to limit the protection scope of the present invention. A person skilled in the art may also easily understand that modules, units, or steps in embodiments described in the present invention and shown in the accompany drawings may be combined and designed according to different configurations.

Figure 1:
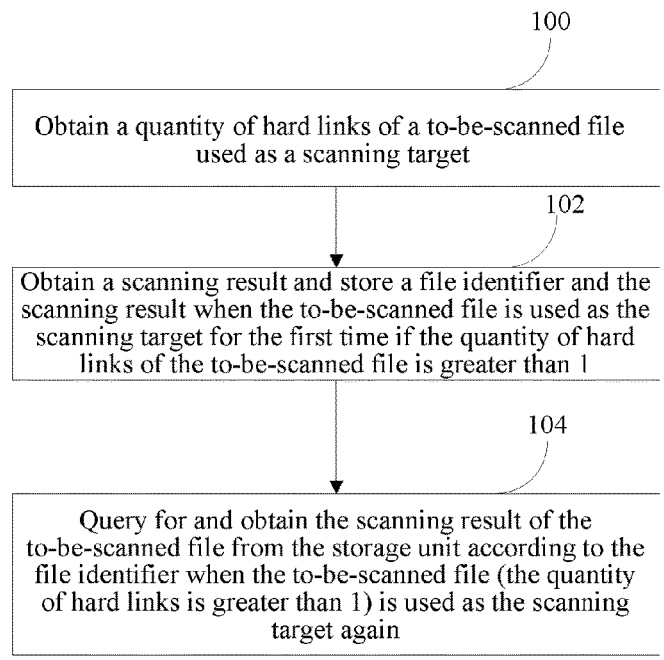
FIG. 1 is a flowchart of a file scanning method according to an embodiment of the present invention.

FIG. 1 is a flowchart of a file scanning method according to an embodiment of the present invention. Referring to FIG. 1, the method includes:

100: Obtain a quantity of hard links of a to-be-scanned file used as a scanning target.

In this embodiment, any existing method that can obtain a quantity of hard links of a file may be used, for example, the quantity of hard links of the to-be-scanned file is obtained by using an application program interface of an operating system. This embodiment does not specifically limit the method for obtaining a quantity of hard links of a file.

In the present invention, "a to-be-scanned file used as a scanning target" refers to a file whose scanning result needs to be obtained, and does not refer to only a file that needs to be scanned by a scanning engine. In a scenario of scanning a Windows operating system file to which the embodiments of the present invention are applicable, all files in the windows directory of a system installation disk need to be traversed, and each time a file is traversed, the method provided in the embodiments of the present invention is used to obtain the scanning result of the file. For example, when a file notepad.exe in the windows directory of the system installation disk is traversed, the file notepad.exe is the file whose scanning result needs to be obtained, and when a file notepad.exe in a system 32 directory in the windows directory of the system installation disk is traversed, the file notepad.exe is the file whose scanning result needs to be obtained. In the existing technology, the scanning results of the files notepad.exe in different paths are all obtained by invoking the scanning engine. However, in the embodiments of the present invention, the scanning results of the files notepad.exe in different paths are obtained in different manners, which are described in detail in the following.

That is, in an application scenario where files in a file set (for example, a directory) are traversed to obtain scanning results of the files in sequence, each time a file is traversed, the method provided in the present invention is used to obtain the scanning result of file, and the file traversed each time is the to-be-scanned file used as the scanning target. A person skilled in the art should understand that the so called "traverse" indicates an access to each to-be-processed object in sequence. In the embodiment of the present invention, after each time a file is traversed, the file is processed as a to-be-scanned file, and after the file is processed, a next file is traversed and processed, which is repeated until the traversal ends.

102: Obtain a scanning result and store a file identifier and the scanning result when the to-be-scanned file is used as the scanning target for the first time if the quantity of hard links of the to-be-scanned file is greater than 1. Specifically, the scanning result of the to-be-scanned file is obtained by invoking a scanning engine, and the file identifier uniquely identifying the to-be-scanned file and the corresponding scanning result of the to-be-scanned file are stored to a storage unit. The storage unit is configured to store the file identifier and the scanning result of the file with more than one hard link. For example, the storage unit may be any existing storage medium such as a cache memory or a hard disk. In other words, the file identifier and the scanning result of the to-be-scanned file may be stored in any form such as a temporary file or a normal file.

It should be noted that the "uniquely identifying" mentioned in the present invention may be understood as that a to-be-scanned file is only represented by its file identifier, and the to-be-scanned file and the file identifier are in one-to-one correspondence; or it may be understood as uniqueness of a file in a physical magnetic disk, a partition, a volume, or a file system. For example, the file identifier uniquely identifying the to-be-scanned file may include: a starting cluster number of the to-be-scanned file in the partition/volume, a starting offset address of the to-be-scanned file in the partition/volume relative to the physical magnetic disk, a starting sector number of the to-be-scanned file in the partition/volume relative to the physical magnetic disk, a starting offset address of the to-be-scanned file in the physical magnetic disk, a starting sector number of the to-be-scanned file in the physical magnetic disk, and data indicating file uniqueness in the file system (for example, FILE_ID_INFO of the NTFS file system of the Windows operating system). Moreover, this concept is also applicable when the storage includes at least two physical magnetic disks.

104: Query for and obtain the scanning result of the to-be-scanned file from the storage unit according to the file identifier when the to-be-scanned file (the quantity of hard links is greater than 1) is used as the scanning target again.

It should be noted that, in the present invention, "again" includes any one time after the first time, and does not only refer to the second time. A person skilled in the art should understand that, because of existence of hard links, the same file in the magnetic disk may be traversed for many times in a file scanning process, and therefore, for such a file, the file may be used as the scanning target for the first time and then be used as the scanning target again.

By using the file scanning method according to the embodiment of the present invention, a to-be-scanned file may be processed according to the quantity of hard links of the to-be-scanned file. Specifically, for a file with more than one hard link, scanning is performed on the file only when the file is used as a to-be-scanned file for the first time; however, when the file is used as the to-be-scanned file again, a result of the first scanning may be directly obtained without repeated scanning, which significantly decreases IO overhead and CPU overhead during a scanning process and improves file scanning efficiency.

Optionally, in an implementation manner 1 of this embodiment, whether the to-be-scanned file is used as the scanning target for the first time is determined in the following manner:

querying the storage unit according to the file identifier uniquely identifying the to-be-scanned file, and if the file identifier is not stored in the storage unit, determining that the to-be-scanned file is used as the scanning target for the first time, and at this time, storing the file identifier and the scanning result obtained by the scanning engine to the storage unit; on the contrary, if the file identifier is stored in the storage unit, determining that the to-be-scanned file is used as the scanning target again, and at this time, obtaining the scanning result by using the storage unit.

The foregoing implementation manner 1 is described in detail later.

Optionally, in an implementation manner 2 of this embodiment, whether the to-be-scanned file is used as the scanning target for the first time is determined in the following manner:

querying the storage unit according to the file identifier uniquely identifying the to-be-scanned file, and if the scanning result corresponding to the file identifier is not stored in the storage unit, determining that the to-be-scanned file is used as the scanning target for the first time, and at this time, storing the file identifier and the scanning result obtained by the scanning engine to the storage unit; on the contrary, if the file identifier is stored in the storage unit, determining that the to-be-scanned file is used as the scanning target again, and at this time, obtaining the scanning result by using the storage unit.

The foregoing implementation manner 2 is described in detail later.

Certainly, the method for determining whether to a to-be-scanned file is used as a scanning target for the first time or again is not limited to the foregoing two implementation manners. However, as long as the scanning result is obtained in manners corresponding to two cases "a to-be-scanned file is used as a scanning target for the first time" and "the to-be-scanned file is used as the scanning target again" as the embodiment shown in FIG. 1, the manners shall all fall in the protection scope of the present invention.

Figure 2:
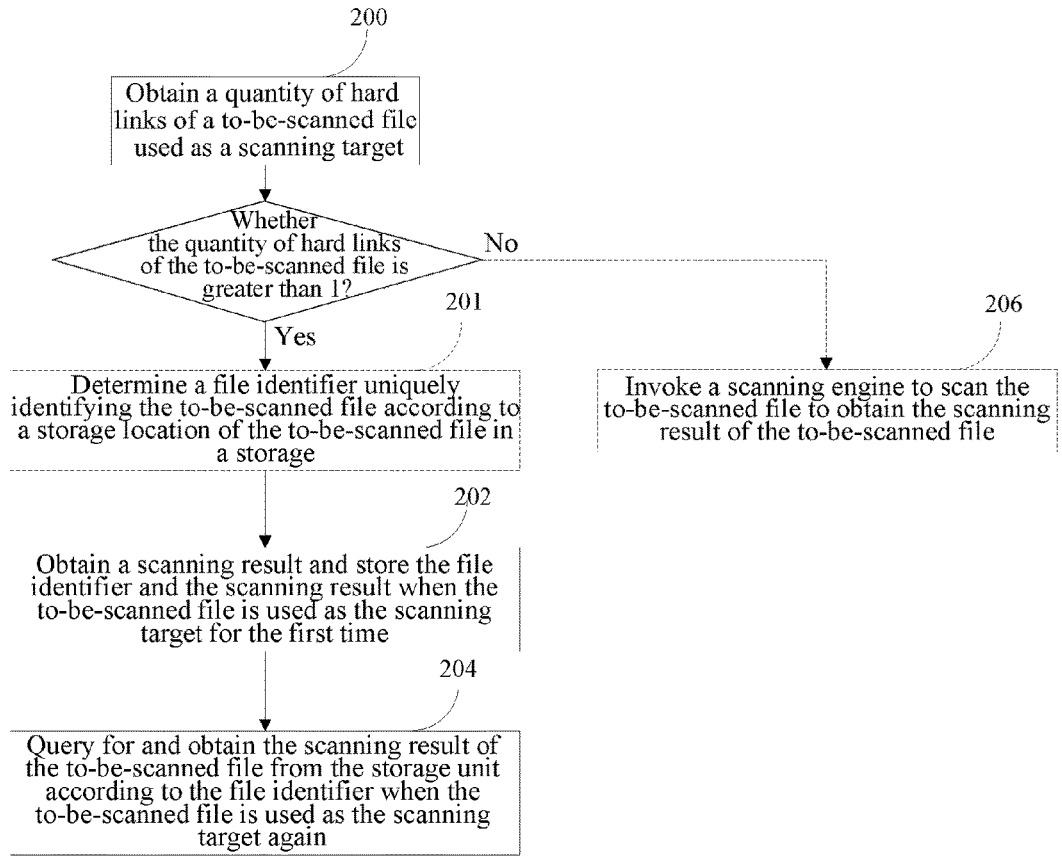
FIG. 2 is a flowchart of another file scanning method according to an embodiment of the present invention.

FIG. 2 is a flowchart of another file scanning method according to an embodiment of the present invention. Referring to FIG. 2, the method includes:

200: Obtain a quantity of hard links of a to-be-scanned file used as a scanning target.

Optionally, in an implementation manner of this embodiment, the quantity of hard links of the to-be-scanned file may be obtained by using an application program interface of an operating system (for example, an application program interface GetFileInformationByHandle of the Windows operating system). Certainly, any existing method that can obtain the quantity of hard links of the file may also be used, which is not specifically limited in this embodiment.

202: Obtain a scanning result and store a file identifier and the scanning result when the to-be-scanned file is used as the scanning target for the first time if the quantity of hard links of the to-be-scanned file is greater than 1. Specifically, the scanning result of the to-be-scanned file is obtained by invoking a scanning engine, and the file identifier uniquely identifying the to-be-scanned file and the scanning result of the to-be-scanned file are stored to a storage unit.

204: Query for and obtain the scanning result of the to-be-scanned file from the storage unit according to the file identifier when the to-be-scanned file (the quantity of hard links is greater than 1) is used as the scanning target again.

Optionally, in an implementation manner of this embodiment, as shown in the dotted box, after 200, the method may further include:

201: Determine a file identifier uniquely identifying the to-be-scanned file according to a storage location of the to-be-scanned file in a storage if the quantity of hard links of the to-be-scanned file is greater than 1.

In an optional implementation manner, 201 is implemented in the following manner: obtaining a storage location of the to-be-scanned file in a magnetic disk, and using the storage location as the file identifier. For example, the implementation manner is applicable when the storage includes only one physical magnetic disk. The storage location of the to-be-scanned file in the magnetic disk includes: a starting cluster number of the to-be-scanned file in a partition/volume, a starting offset address of the to-be-scanned file in the partition/volume relative to a physical magnetic disk, a starting sector number of the to-be-scanned file in the partition/volume relative to the physical magnetic disk, a starting offset address of the to-be-scanned file in the physical magnetic disk, a starting sector number of the to-be-scanned file in the physical magnetic disk, and the like.

In another optional implementation manner, 201 is implemented in the following manner: obtaining a magnetic disk identifier of a magnetic disk where the to-be-scanned file is located and a storage location of the to-be-scanned file in the magnetic disk first, and determining the file identifier according to the magnetic disk identifier of the magnetic disk where the to-be-scanned file is located and the storage location of the to-be-scanned file in the magnetic disk. For example, an array form (magnetic disk identifier, storage location in the magnetic disk) is used as the file identifier, or the file identifier is generated by encoding the magnetic disk of the magnetic disk where the to-be-scanned file is located and the storage location of the to-be-scanned file in the magnetic disk by using a specific code form. For example, the implementation manner is applicable when the storage includes at least two magnetic disks. The magnetic disk identifier includes information that can one-to-one correspond to the magnetic disks such as a magnetic sequence number or sequence numbers specifically allocated to multiple magnetic disks.

Certainly, in other embodiments of the present invention, other information may also be used as the file identifier, as long as the information can uniquely identify the to-be-scanned file, for example, an identifier specifically set according to the location of the to-be-scanned file in the magnetic disk.

Optionally, in 201, the location information of the to-be-scanned file in the magnetic disk may be obtained by using an application program interface of an operating system, for example, by using an application program interface FSCTL_GET_RETRIEVAL_POINTER_BASE or FSCTL_GET_RETRIEVAL_POINTERS of the Windows operating system. Certainly, any other existing method that can obtain the location of the to-be-scanned file in the magnetic disk may also be used, which is not specifically limited in this embodiment.

Optionally, in an implementation manner of this embodiment, as shown in the dotted box, after 204, the method may further include:

206: Invoke a scanning engine to scan the to-be-scanned file to obtain the scanning result of the to-be-scanned file if the quantity of hard links of the to-be-scanned file is 1. Therefore, the scanning result of the to-be-scanned file with one hard link can be obtained.

Optionally, in an implementation manner of this embodiment, as shown in the dotted box, after 206, the method may further include:

Optionally, after obtaining the scanning result of the to-be-scanned file, a next to-be-scanned file used as the scanning target may be determined according to a file traversing sequence, and the file is processed by using the same steps shown in 200-206, which is not described again herein.

The "after obtaining the scanning result of the to-be-scanned file" includes after invoking the scanning engine to scan the to-be-scanned file to obtain the scanning result of the to-be-scanned file, and also includes after querying for and obtaining the scanning result of the to-be-scanned file from the storage unit according to the file identifier.

Figure 3:
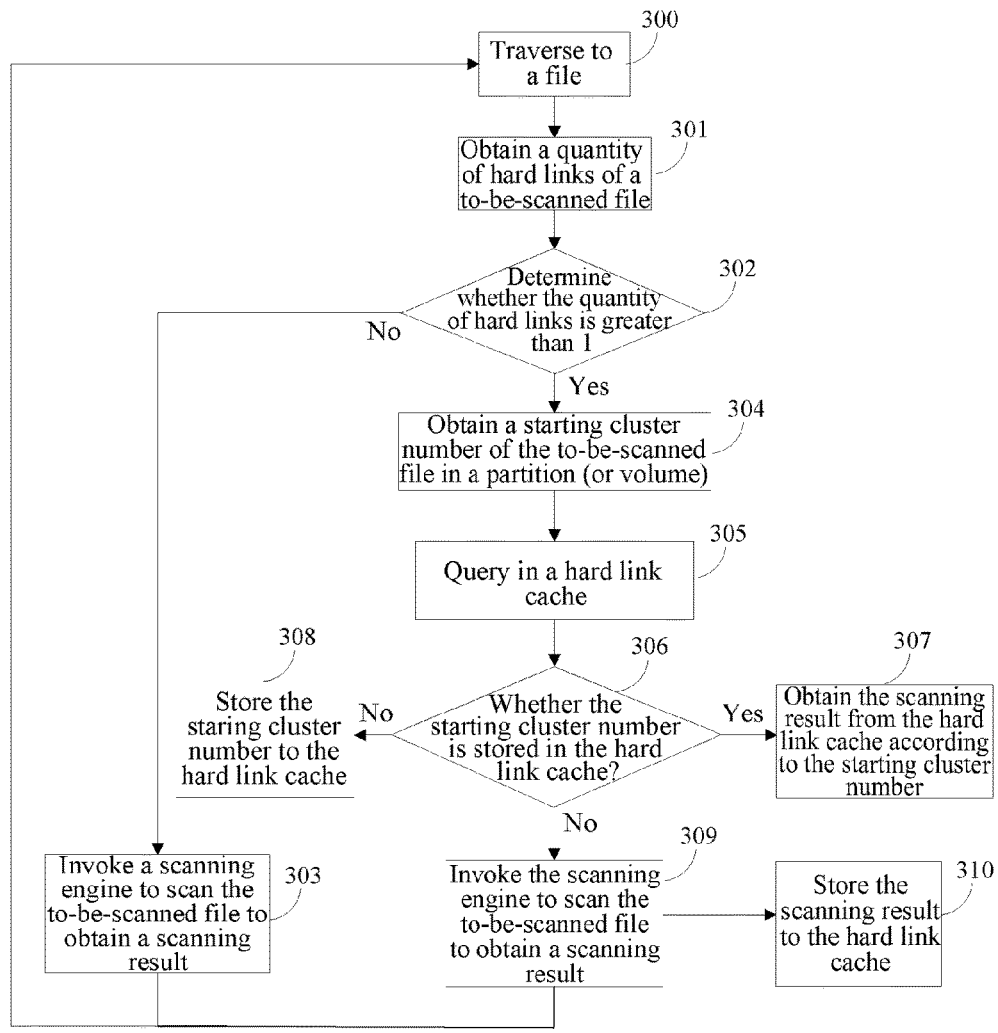
FIG. 3 is a flowchart of still another file scanning method according to an embodiment of the present invention.

FIG. 3 is a flowchart of still another file scanning method according to an embodiment of the present invention. Referring to FIG. 3, the method includes:

300: Traverse to a file. The file is a to-be-scanned file used as a scanning target.

301: Obtain a quantity of hard links of the to-be-scanned file. This embodiment does not limit the specific obtaining method.

302: Determine whether the quantity of hard links is greater than 1; if the quantity of hard links is smaller than or equal to 1, perform 303, and if the quantity of hard links is greater than 1, perform 304.

303: Invoke a scanning engine to scan the to-be-scanned file to obtain a scanning result, and then perform 300. The scanning result may be a black flag, a white flag, or a grey flag, and specifically, the white flag indicates that the scanning result is normal, the grey flag indicates that whether the scanning result is normal cannot be determined, and the black flag indicates that the scanning result is abnormal. The scanning result may also include a corresponding virus name when the scanning result is the black flag.

More specifically, in an implementation manner of this embodiment, the scanning result may include multiple scanning records. Each scanning result may include: a sequence number (indicates the sequence number of the scanning record), a file identifier, a scanning result corresponding to the file identifier, and a corresponding virus name when the scanning result is the black flag. In such an implementation manner, it is unnecessary to store contents of all fields in a scanning record at the same time, for example, the sequence number and the file identifier are stored first, and then the scanning result and the virus name are stored. Therefore, when the scanning processing is performed on a file "again", although the storage unit does not finish storing the scanning result obtained during the "first time" scanning, it may be determined that, according to the file identifier, the scanning engine does not need to be invoked to perform the scanning processing first, and then after a set condition is satisfied (for example, after a set delay), the scanning result is obtained from the storage unit (for example, the scanning result is obtained according to a sequence number corresponding to the file identifier). As a result, the file scanning efficiency is improved.

304: Obtain a starting cluster number of the to-be-scanned file in a partition (or volume). Or in other embodiments, a starting sector number of the to-be-scanned file may be obtained.

305: Query in a hard link cache. 306: Determine whether the starting cluster number of the to-be-scanned file in the partition (or volume) is stored in the hard link cache; if the starting cluster number of the to-be-scanned file in the partition (or volume) is stored in the hard link cache, it indicates that the to-be-scanned file is used as the scanning target again, and at this time, perform 307; if the starting cluster number of the to-be-scanned file in the partition (or volume) is not stored in the hard link cache, it indicates that the to-be-scanned file is used as the scanning target for the first time, and at this time, perform 308 and 309.

307: Obtain the scanning result from the hard link cache according to the starting cluster number, and then perform 300.

308: Store the starting cluster number of the to-be-scanned file in the partition (volume) to the hard link cache.

309: Invoke the scanning engine to scan the to-be-scanned file to obtain a scanning result, and then perform 310 and 300.

310: Store the scanning result to the hard link cache.

In this embodiment, the implementation manner 1 mentioned above is used to determine whether the to-be-scanned file is used as the scanning target for the first time.

In another embodiment of the present invention, the implementation manner 2 mentioned above is used to determine whether a to-be-scanned file is used as a scanning target for the first time. The difference between overall processes of this embodiment and the embodiment shown in FIG. 3 lies in that, if it is determined in 306 that the cluster number of the to-be-scanned file in the partition (volume) is not stored in the hard link cache, 308 and 309 are performed in sequence after 306; and 310 and 300 are performed in sequence after 309. Compared with the embodiment shown in FIG. 3, in this embodiment, the file scanning time may be increased.

The foregoing describes the file scanning method of the present invention in combination with FIG. 1 to FIG. 3. The following describes a file scanning apparatus of the present invention in combination with accompany drawings.

Figure 4:
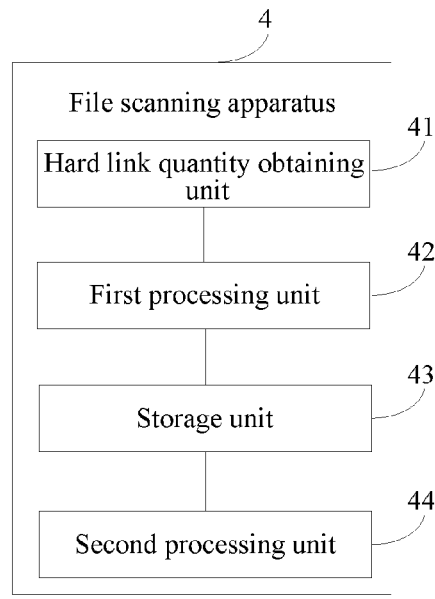
FIG. 4 is a block diagram of a file scanning apparatus according to an embodiment of the present invention.

FIG. 4 is a block diagram of a file scanning apparatus according to an embodiment of the present invention. Referring to FIG. 4, the file scanning apparatus 4 includes a hard link quantity obtaining unit 41, a first processing unit 42, a storage unit 43, and a second processing unit 44, which are separately described in the following:

The hard link quantity obtaining unit 41 is configured to obtain a quantity of hard links of a to-be-scanned file used as a scanning target. A specific obtaining method may be any existing method such as obtaining the quantity of hard links by using an application program interface of an operating system, which is not limited in the present invention.

The first processing unit 42 is configured to: if the quantity of hard links of the to-be-scanned file is greater than 1, when the to-be-scanned file is used as the scanning target for the first time, invoke a scanning engine to scan the to-be-scanned file to obtain a scanning result of the to-be-scanned file, and store a file identifier uniquely identifying the to-be-scanned file and the scanning result of the to-be-scanned file to the storage unit 43.

The storage unit 43 is configured to store the file identifier and the scanning result, and preferably store the file identifier and the scanning result in a cache form.

The second processing unit 44 is configured to: if the quantity of hard links of the to-be-scanned file is greater than 1, when the to-be-scanned file is used as the scanning target again, query for and obtain the scanning result of the to-be-scanned file from the storage unit 43 according to the file identifier.

By using the file scanning apparatus 4 according to the embodiment of the present invention, the to-be-scanned file may be processed according to the quantity of hard links of the to-be-scanned file. Specifically, for a file with more than one hard link, scanning is performed on the file only when the file is used as a to-be-scanned file for the first time; however, when the file is used as the to-be-scanned file again, a result of the first scanning may be directly obtained without repeated scanning, which significantly decreases IO overhead and CPU overhead during a scanning process and improves file scanning efficiency.

Figure 5A:
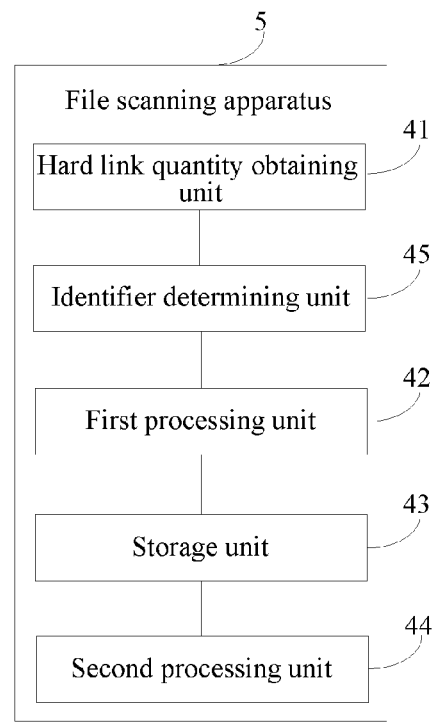
FIG. 5A is a block diagram of another file scanning apparatus according to an embodiment of the present invention.

FIG. 5A is a block diagram of another file scanning apparatus according to an embodiment of the present invention. Referring to FIG. 5A, in addition to a hard link quantity obtaining unit 41, a first processing unit 42, a storage unit 43, and a second processing unit 44, a file scanning apparatus 5 further includes an identifier determining unit 45, which is configured to determine a file identifier according to a storage location of a to-be-scanned file in a storage.

Figure 5B:
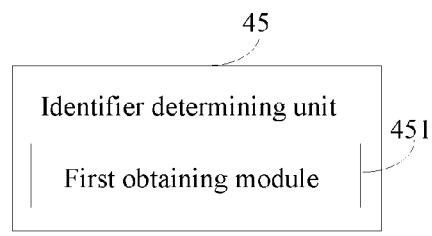
FIG. 5B is a block diagram of an identifier determining unit according to the embodiment shown in FIG. 5A.

Optionally, in an implementation manner of this embodiment, as shown in FIG. 5B, the identifier determining unit 45 includes a first obtaining module 451, which is configured to obtain a storage location of the to-be-scanned file in a magnetic disk, and use the storage location as the file identifier.

Figure 5C:
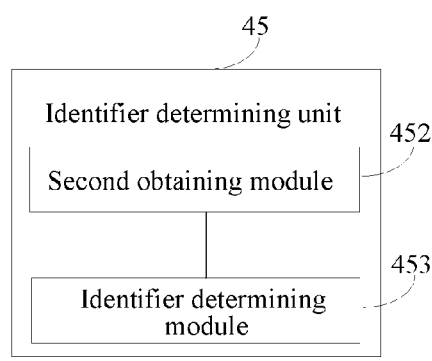
FIG. 5C is a block diagram of an identifier determining unit according to the embodiment shown in FIG. 5A.

Optionally, in an implementation manner of this embodiment, as shown in FIG. 5C, the identifier determining unit 45 includes: a second obtaining module 452, configured to obtain a magnetic disk identifier of a magnetic disk where the to-be-scanned file is located and a storage location of the to-be-scanned file in the magnetic disk; and an identifier determining module 453, configured to determine the file identifier according to the magnetic disk identifier of the magnetic disk where the to-be-scanned file is located and the storage location of the to-be-scanned file in the magnetic disk.

Figure 6:
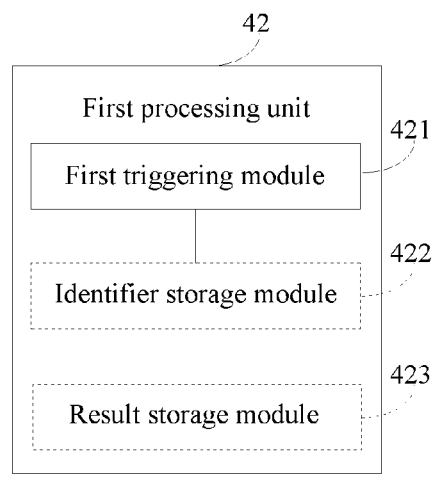
FIG. 6 is a block diagram of a first processing unit according to an embodiment of the present invention.

FIG. 6 is a block diagram of a first processing unit according to an embodiment of the present invention. Specifically, FIG. 6 is a block diagram of the first processing unit 42 in the file scanning apparatus shown in FIG. 4 or FIG. 5. As shown in FIG. 6, the first processing unit 42 includes:

a first triggering module 421, configured to query the storage unit 43 according to the file identifier, and trigger, when the file identifier is not stored in the storage unit 43, to invoke the scanning engine.

Optionally, as shown in the dotted box, the first processing unit 42 includes:

an identifier storage module 422, configured to store the file identifier to the storage unit 43; and a result storage module 423, configured to store, after the first processing unit 42 obtains the scanning result of the to-be-scanned file, the scanning result to the storage unit 43. At this time, the first triggering module 421 is also configured to trigger, when it is determined that the file identifier is not stored in the storage unit 43, the identifier storage module 422. That is to say, the first processing unit 42 may perform scanning engine invoking and file identifier storage separately after it is determined that the file identifier is not stored in the storage unit 43. Certainly, in other embodiments, the first processing unit 42 may also perform the file identifier storage and the scanning engine invoking in sequence after it is determined that the file identifier is not stored in the storage unit 43.

Figure 7:
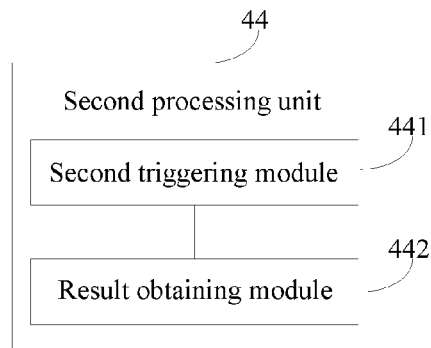
FIG. 7 is a block diagram of a second processing unit according to an embodiment of the present invention.

FIG. 7 is a block diagram of a second processing unit according to an embodiment of the present invention. Specifically, FIG. 7 is a block diagram of the second processing unit 44 in the file scanning apparatus shown in FIG. 4 or FIG. 5. As shown in FIG. 7, the second processing unit 44 includes:

a second trigger module 441, configured to query the storage unit 43 according to the file identifier, and trigger, when the file identifier is stored in the storage unit 43, a result obtaining module 442; and the result obtaining module 442, configured to query for and obtain the scanning result of the to-be-scanned file from the storage unit 43 according to the file identifier.

A person skilled in the art should understand that the first triggering module 421 and the second triggering module 441 may be integrated into one module, which is configured to query the storage unit 43 according to the file identifier, and trigger the second processing unit 44 to obtain the scanning result from the storage unit 43 if the file identifier is stored in the storage unit 43, or trigger the first processing unit 42 to store the file identifier and obtain and store the scanning result if the file identifier is not stored in the storage unit 43.

Figure 8:
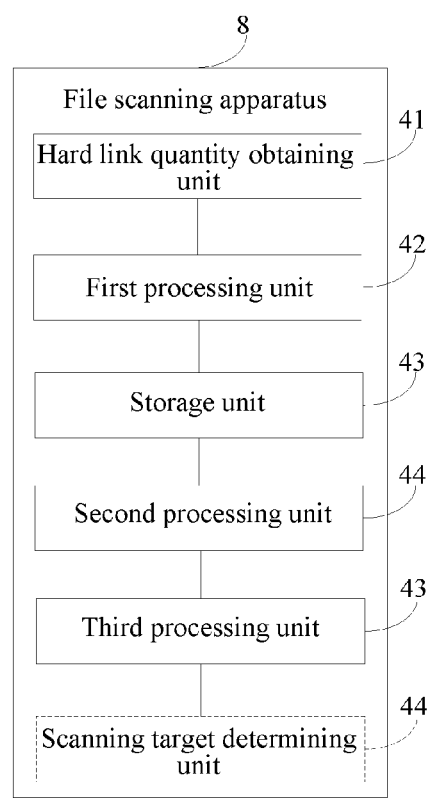
FIG. 8 is a block diagram of still another file scanning apparatus according to an embodiment of the present invention.

FIG. 8 is a block diagram of still another file scanning apparatus according to an embodiment of the present invention. Referring to FIG. 8, in addition to a hard link quantity obtaining unit 41, a first processing unit 42, a storage unit 43, and a second processing unit 44, a file scanning apparatus 8 further includes a third processing unit 46, which is configured to: when a quantity of hard links of a to-be-scanned file is 1, invoke a scanning engine to scan the to-be-scanned file to obtain a scanning result of the to-be-scanned file.

Optionally, as shown in the dotted box, the file scanning apparatus 8 may further include a scanning target determining unit 47, configured to determine, after the apparatus obtains the scanning result of the to-be-scanned file, a next to-be-scanned file used as the scanning target.

Certainly, in the embodiment, the file scanning apparatus 8 may further include the identifier determining unit 45 described above, which is not described again herein.

For descriptions of processing manners of units and modules, data flow directions, involved terms, application scenarios, and the like in the apparatus embodiments, reference may be made to the method embodiments, which are not described again herein.

Through the foregoing description of the implementation manners, a person skilled in the art may clearly understand that the present invention may be implemented by means of a combination of software and a hardware platform. Based on such understanding, all or some of the technical solutions of the present invention contributing to the related art may be implemented in a form of a software product. The computer software product is stored in a storage medium (such as a ROM/RAM, a magnetic disk, or an optical disc), and includes several instructions for instructing a computer device (which may be a personal computer, a server, a smart phone or a network device) to perform the methods described in the embodiments or some parts of the embodiments of the present invention.

Terms and wordings used in the specification of the present invention are only for illustrative purpose, and do not imply a limitation. A person skilled in the art should understand that various modifications may be made to details of the foregoing embodiments without departing from the basic principle of the disclosed implementation manners. Therefore, the scope of the present invention is determined by only the claims, and in the claims, unless otherwise specified, all terms should be understood in the broadest reasonable sense.

What is claimed is:

1. A computer-implemented method for scanning a file on a computer comprising a processor, comprising:
   obtaining, using the processor, a quantity of hard links of a to-be-scanned file used as a scanning target, via an application program interface of an operating system installed in the computer;
   comparing, using the processor, the quantity of hard links of the to-be-scanned file with 1;
   if the quantity of hard links of the to-be-scanned file is greater than 1, when the to-be-scanned file is used as the scanning target for the first time, invoking, using the processor, a scanning engine to scan the to-be-scanned file to obtain a scanning result of the to-be-scanned file, and storing, using the processor, a file identifier uniquely identifying the to-be-scanned file and the scanning result of the to-be-scanned file to a storage unit, wherein the obtained scanning result comprises a black, white or grey flag indicating a characteristic of the scanning result, and further comprises a virus name when the obtained scanning result comprises a black flag, and
   when the to-be-scanned file is used as the scanning target again, querying for and obtaining, using the processor, the scanning result of the to-be-scanned file from the storage unit according to the file identifier.

2. The method according to claim 1, further comprising:
   determining the file identifier according to a storage location of the to-be-scanned file in a storage.

3. The method according to claim 2, wherein the determining the file identifier according to a storage location of the to-be-scanned file in a storage comprises:
   obtaining a storage location of the to-be-scanned file in a magnetic disk, and using the storage location as the file identifier; or
   obtaining a magnetic disk identifier of a magnetic disk where the to-be-scanned file is located and a storage location of the to-be-scanned file in the magnetic disk, and determining the file identifier according to the magnetic disk identifier of the magnetic disk where the to-be-scanned file is located and the storage location of the to-be-scanned file in the magnetic disk.

4. The method according to claim 1, wherein the when the to-be-scanned file is used as the scanning target for the first time, invoking a scanning engine to scan the to-be-scanned file to obtain a scanning result of the to-be-scanned file comprises:
   determining whether the file identifier is stored in the storage unit, and if the file identifier is not stored in the storage unit, invoking the scanning engine to scan the to-be-scanned file to obtain the scanning result of the to-be-scanned file.

5. The method according to claim 4, wherein the storing a file identifier uniquely identifying the to-be-scanned file and the scanning result of the to-be-scanned file to a storage unit comprises:
   after determining that the file identifier is not stored in the storage unit, storing the file identifier to the storage unit; and
   after invoking the scanning engine and obtaining the scanning result of the to-be-scanned file, storing the scanning result to the storage unit.

6. The method according to claim 1, wherein the when the to-be-scanned file is used as the scanning target again, querying for and obtaining the scanning result of the to-be-scanned file from the storage unit according to the file identifier comprises:
   determining whether the file identifier is stored in the storage unit and if the file identifier is stored in the storage unit, querying for and obtaining the scanning result of the to-be-scanned file from the storage unit according to the file identifier.

7. The method according to claim 1, wherein the method further comprises: if the quantity of hard links of to-be-scanned file is 1, invoking the scanning engine to scan the to-be-scanned file to obtain the scanning result of the to-be-scanned file.

8. A file scanning apparatus, comprising:
   a processor; and
   a memory storing instructions, which when executed by the processor, cause the processor to perform operations, the operations comprising:
   obtaining a quantity of hard links of a to-be-scanned file used as a scanning target, via an application program interface of an operating system installed in the apparatus;
   comparing, using the processor, the quantity of hard links of the to-be-scanned file with 1;
   if the quantity of hard links of the to-be-scanned file is greater than 1, when the to-be-scanned file is used as the scanning target for the first time, invoking a scanning engine to scan the to-be-scanned file to obtain a scanning result of the to-be-scanned file and storing a file identifier uniquely identifying the to-be-scanned file and the scanning result of the to-be-scanned file to a storage unit, wherein the obtained scanning result comprises a black, white or grey flag indicating a characteristic of the scanning result, and further comprises a virus name when the obtained scanning result comprises a black flag;
   storing the file identifier and the scanning result; and
   if the quantity of hard links of the to-be-scanned file is greater than 1, when the to-be-scanned file is used as the scanning target again, querying for and obtaining the scanning result of the to-be-scanned file from the storage unit according to the file identifier.

9. The apparatus according to claim 8, wherein the operations further comprises:
   determining the file identifier according to a storage location of the to-be-scanned file in a storage.

10. The apparatus according to claim 9, wherein the determining the file identifier according to a storage location of the to-be-scanned file in a storage comprises:
    obtaining a storage location of the to-be-scanned file in a magnetic disk, and using the storage location as the file identifier; or
    the identifier determining unit comprises:
    obtaining a magnetic disk identifier of a magnetic disk where the to-be-scanned file is located and a storage location of the to-be-scanned file in the magnetic disk, and determining the file identifier according to the magnetic disk identifier of the magnetic disk where the to-be-scanned file is located and the storage location of the to-be-scanned file in the magnetic disk.

11. The apparatus according to claim 8, wherein the when the to-be-scanned file is used as the scanning target for the first time, invoking a scanning engine to scan the to-be-scanned file to obtain a scanning result of the to-be-scanned file comprises:
   determining whether the file identifier is stored in the storage unit, and triggering, when it is determined that the file identifier is not stored in the storage unit, to invoke the scanning engine.

12. The apparatus according to claim 11, wherein the storing a file identifier uniquely identifying the to-be-scanned file and the scanning result of the to-be-scanned file to a storage unit comprises:
   storing the file identifier to the storage unit, and
   storing, after obtaining the scanning result of the to-be-scanned file, the scanning result to the storage unit
   wherein the first triggering module is also configured to trigger, when it is determined that the file identifier is not stored in the storage unit, the identifier storage module.

13. The apparatus according to claim 8, wherein the when the to-be-scanned file is used as the scanning target again, querying for and obtaining the scanning result of the to-be-scanned file from the storage unit according to the file identifier comprises:
   a second triggering module, configured to query determining whether the file identifier is stored in the storage unit according to the file identifier, and trigger, when it is determined that the file identifier is stored in the storage unit, a result obtaining module; and
   querying for and obtaining the scanning result of the to-be-scanned file from the storage unit according to the file identifier if the file identifier is stored in the storage unit.

14. The apparatus according to claim 8, wherein the operations further comprise:
   if the quantity of hard links of to-be-scanned file is 1, invoking the scanning engine to scan the to-be-scanned file to obtain the scanning result of the to-be-scanned file.

15. A non-transitory computer storage medium, storing a computer program, wherein when executed by one or more computers, the computer program causes the one or more computers to perform the following operations:
   operations comprising steps comprised in the file scanning method according to claim 1.

\* \* \* \* \*